US012791099B2

(12) United States Patent
Ohashi et al.

(10) Patent No.: US 12,791,099 B2
(45) Date of Patent: Nov. 10, 2026

(54) CONDUCTIVE SLIDING MEMBER, SEALING DEVICE, AND MANUFACTURING METHOD OF SEALING DEVICE

(71) Applicant: NOK CORPORATION, Tokyo (JP)

(72) Inventors: Shota Ohashi, Fukushima (JP); Hideaki Nagahamaya, Fukushima (JP); Yuki Sato, Fukushima (JP); Yusuke Kamiya, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 19/109,888

(22) PCT Filed: Aug. 30, 2023

(86) PCT No.: PCT/JP2023/031393
§ 371 (c)(1),
(2) Date: Mar. 7, 2025

(87) PCT Pub. No.: WO2024/053500
PCT Pub. Date: Mar. 14, 2024

(65) Prior Publication Data

US 2026/0078825 A1 Mar. 19, 2026

(30) Foreign Application Priority Data

Sep. 9, 2022 (JP) ................................ 2022-143950

(51) Int. Cl.
*F16J 15/3284* (2016.01)
*F16J 15/3204* (2016.01)
*F16J 15/328* (2016.01)

(52) U.S. Cl.
CPC ....... *F16J 15/3284* (2013.01); *F16J 15/3204* (2013.01); *F16J 15/328* (2013.01)

(58) Field of Classification Search
CPC .... F16J 15/3284; F16J 15/3204; F16J 15/328; F16J 15/3216; F16J 15/322;
(Continued)

(56) References Cited

U.S. PATENT DOCUMENTS 3,612,547 A * 10/1971 Kan .................... F16J 15/3268
277/572
3,771,799 A * 11/1973 Sekulich ............. F16J 15/3456
277/386
(Continued)

FOREIGN PATENT DOCUMENTS

CN 110242748 9/2019
DE 10 2019 217 072 5/2021
(Continued)

OTHER PUBLICATIONS

International Search Report issued in International Patent Application No. PCT/JP2023/031393, dated Nov. 21, 2023, and English language translation thereof.

(Continued)

*Primary Examiner* — Gilbert Y Lee
(74) *Attorney, Agent, or Firm* — GREENBLUM & BERNSTEIN, P.L.C.

(57) ABSTRACT

A conductive sliding member includes, in an annular space between a relatively rotating shaft and a housing having conductivity, an annular conductive lip portion that is formed of a molded body of an elastic body having conductivity, and is slidable on a surface of the shaft; and a sealing device bonding portion that is provided on an outer peripheral side of the conductive lip portion and is capable of being bonded to a sealing device main body portion on a side opposite to a sealing target fluid side of a sealing device that seals the annular space.

8 Claims, 11 Drawing Sheets

(58) Field of Classification Search
CPC .. F16J 15/3232; F16J 15/3248; F16J 15/3252; F16J 15/326; F16J 15/3264
See application file for complete search history.

(56) References Cited

U.S. PATENT DOCUMENTS

| | | | | |
|---|---|---|---|---|
| 4,822,059 | A * | 4/1989 | Shimasaki | F16J 15/3232 277/564 |
| 11,131,386 | B2 * | 9/2021 | Dahlhaus-Preussler | F16J 15/3232 |
| 2014/0203514 | A1 | 7/2014 | Colineau et al. | |
| 2018/0313449 | A1 | 11/2018 | Dahlhaus-Preussler et al. | |
| 2018/0355977 | A1 * | 12/2018 | Tanner | F16J 15/3248 |
| 2019/0277404 | A1 | 9/2019 | Colineau et al. | |
| 2020/0292079 | A1 | 9/2020 | Ito et al. | |

FOREIGN PATENT DOCUMENTS

| | | |
|---|---|---|
| JP | 2008-25788 | 2/2008 |
| JP | 2014-142065 | 8/2014 |
| JP | 2015-207534 | 11/2015 |
| JP | 2018-189236 | 11/2018 |
| WO | 2019/131899 | 7/2019 |

OTHER PUBLICATIONS

Written Opinion issued in International Patent Application No. PCT/JP2023/031393, dated Nov. 21, 2023, and English language translation thereof.
Japanese Office Action issued in Japan Patent Appl. No. 2024-545604, dated Feb. 6, 2025, along with an English translation thereof.
Extended European Search Report received in corresponding EP application No. 23863039.6, dated Aug. 3, 2026.

* cited by examiner

CONDUCTIVE SLIDING MEMBER, SEALING DEVICE, AND MANUFACTURING METHOD OF SEALING DEVICE

CROSS REFERENCE TO RELATED APPLICATIONS

This is the U.S. National Stage of International Application No. PCT/JP2023/031393, filed Aug. 30, 2023, which claims the benefit of Japanese Patent Application No. 2022-143950, filed Sep. 9, 2022, the disclosure of which is hereby incorporated by reference in its entirety.

TECHNICAL FIELD

The present disclosure relates to a conductive sliding member, a sealing device, and a manufacturing method of a sealing device.

BACKGROUND ART

It is known that, in a vehicle equipped with an electric motor such as an electric vehicle (EV) and a fuel cell vehicle (FCV), electromagnetic noise to an amplitude modulation (AM) radio or electrical erosion of a bearing may occur due to an induced current generated from a motor. As a technique to address such a case, a vehicular power transmission device including a conductive brush electrically connected to a vehicle body via a case that supports an output shaft is disclosed (for example, see Patent Literature 1). In addition, as a technique to address such a case, a seal including a seal lip made of a conductive polymer material is disclosed (for example, see Patent Literature 2).

DOCUMENT LIST

Patent Literatures

Patent Literature 1: JP 2015-207534 A
Patent Literature 2: JP 2018-189236 A

SUMMARY OF DISCLOSURE

Technical Problem

Meanwhile, the above-described occurrence of electromagnetic noise and electrical erosion may become apparent as a problem in a later stage of development of a drive unit of a vehicle equipped with an electric motor. In such a case, in order to solve the problem, additionally incorporating a conductive brush into a reduction gear or replacing the existing sealing device with a sealing device made of a conductive material may require design changes of the reduction gear. Therefore, in the sealing device, further improvements are required to easily impart conductivity.

The present disclosure has been made in view of the problems described above, and an object thereof is to provide a conductive sliding member, a sealing device, and a manufacturing method of a sealing device which can easily impart conductivity.

Solution to Problem

In order to achieve the object, a conductive sliding member according to an aspect of the present disclosure is a conductive sliding member attached to an annular space between a relatively rotating shaft and a housing having conductivity, the conductive sliding member including an annular conductive lip portion that is formed of a molded body of an elastic body having conductivity, and is slidable on a surface of the shaft; and a sealing device bonding portion that is provided on an outer peripheral side of the conductive lip portion and is capable of being bonded to a sealing device main body portion on a side opposite to a sealing target fluid side of the sealing device main body portion that seals the space.

In the conductive sliding member according to the aspect of the present disclosure, the sealing device bonding portion includes a disk portion bonding portion that is a disk-shaped surface provided on the outer peripheral side of the conductive lip portion and is capable of being bonded to a disk portion of the sealing device main body portion on the side opposite to the sealing target fluid side of the sealing device main body portion, and a cylindrical portion bonding portion that is provided on an outer peripheral side of the disk portion bonding portion and is capable of being bonded to a surface on an outer peripheral side of a cylindrical portion of the sealing device main body portion.

In the conductive sliding member according to the aspect of the present disclosure, the cylindrical portion bonding portion includes a cylindrical portion engagement portion that is capable of being engaged with a cylindrical portion engaged portion provided on a surface of the cylindrical portion of the sealing device main body portion on the outer peripheral side.

In the conductive sliding member according to the aspect of the present disclosure, the disk portion bonding portion includes a disk portion engagement portion that is engaged with a disk portion engaged portion provided on a surface of the disk portion of the sealing device main body portion on a side opposite to the sealing target fluid side.

In order to achieve the object, a sealing device according to another aspect of the present disclosure is a sealing device that ensures sealing of an annular space between a relatively rotating shaft and a housing having conductivity, the sealing device including a sealing device main body portion that is slidable with respect to the shaft and ensures sealing of the space; and a conductive sliding member that is provided on a side opposite to a sealing target fluid side of the sealing device main body portion and is formed of a molded body of a conductive elastic body, wherein the sealing device main body portion includes a seal lip portion that is formed of an elastic body having lower conductivity than the conductive elastic body, and the conductive sliding member includes an annular conductive lip portion that is slidable on a surface of the shaft, and a sealing device bonding portion that is provided on an outer peripheral side of the conductive lip portion and is capable of being bonded to the sealing device main body portion on the side opposite to the sealing target fluid side of the sealing device main body portion that is capable of sealing the space.

In the sealing device according to the aspect of the present disclosure, in the conductive sliding member, the sealing device bonding portion includes a disk portion bonding portion that is a disk-shaped surface provided on the outer peripheral side of the conductive lip portion and is capable of being bonded to a disk portion of the sealing device main body portion on the side opposite to the sealing target fluid side of the sealing device main body portion, and a cylindrical portion bonding portion that is provided on an outer peripheral side of the disk portion bonding portion and is capable of being bonded to a surface on an outer peripheral side of a cylindrical portion of the sealing device main body portion.

In the sealing device according to the aspect of the present disclosure, the cylindrical portion bonding portion includes a cylindrical portion engagement portion that is capable of being engaged with a cylindrical portion engaged portion provided on a surface of the cylindrical portion of the sealing device main body portion on the outer peripheral side.

In the sealing device according to the aspect of the present disclosure, in the conductive sliding member, the disk portion bonding portion includes a disk portion engagement portion that is capable of being engaged with a disk portion engaged portion provided on a surface of the disk portion of the sealing device main body portion on a side opposite to the sealing target fluid side.

In order to achieve the object, a manufacturing method of a sealing device according to another aspect of the present disclosure is a manufacturing method of a sealing device that ensures sealing of an annular space between a relatively rotating shaft and a housing having conductivity, the manufacturing method including a step of preparing a conductive sliding member formed of a molded body of a conductive elastic body; a step of preparing a sealing device main body portion that is formed to be slidable with respect to the shaft and ensures sealing of the space; and a step of bonding the sealing device main body portion and the conductive sliding member to each other on a side opposite to a sealing target fluid side of the sealing device main body portion.

In the manufacturing method of a sealing device according to the aspect of the present disclosure, the conductive sliding member includes an annular conductive lip portion that is formed of the molded body of the conductive elastic body, and is slidable on a surface of the shaft, and a sealing device bonding portion that is provided on an outer peripheral side of the conductive lip portion and is capable of being bonded to the sealing device main body portion on the side opposite to the sealing target fluid side of the sealing device main body portion, and in the step of bonding the sealing device main body portion and the conductive sliding member to each other, the sealing device bonding portion of the conductive sliding member is bonded to the sealing device main body portion.

In the manufacturing method of a sealing device according to the aspect of the present disclosure, the sealing device main body portion includes a reinforcing ring that includes a cylindrical portion formed in a cylindrical shape centered on an axis, and a disk portion that is provided at an end portion of the cylindrical portion on a side opposite to the sealing target fluid side and is formed in a disk shape, and a seal main body portion that is an elastic body having lower conductivity than the conductive elastic body to be molded in the reinforcing ring and includes a seal lip portion, in the conductive sliding member, the sealing device bonding portion includes a disk portion bonding portion that is a disk-shaped surface provided on the outer peripheral side of the conductive lip portion and is capable of being bonded to a disk portion of the sealing device main body portion, and a cylindrical portion bonding portion that is provided on an outer peripheral side of the disk portion bonding portion and is capable of being bonded to a surface on an outer peripheral side of a cylindrical portion of the sealing device main body portion, and in the step of bonding the sealing device main body portion and the conductive sliding member to each other, the disk portion bonding portion of the conductive sliding member is bonded to the disk portion of the sealing device main body portion, and the cylindrical portion bonding portion of the conductive sliding member is bonded to the cylindrical portion of the sealing device main body portion.

In the manufacturing method of a sealing device according to the aspect of the present disclosure, wherein the conductive sliding member includes a cylindrical portion engagement portion that is formed in the cylindrical portion bonding portion and is capable of being engaged with the cylindrical portion of the sealing device main body portion, and a disk portion engagement portion that is formed in the disk portion bonding portion and is capable of being engaged with the disk portion the sealing device main body portion, and in the step of bonding the sealing device main body portion and the conductive sliding member to each other, the disk portion engagement portion of the conductive sliding member is engaged with the disk portion of the sealing device main body portion, and the cylindrical portion engagement portion of the conductive sliding member is engaged with the cylindrical portion of the sealing device main body portion.

Effects of Disclosure

According to a conductive sliding member, a sealing device, and a manufacturing method of a sealing device of the present disclosure, it is possible to easily impart conductivity.

DESCRIPTION OF EMBODIMENTS

Hereinafter, embodiments of the present disclosure will be described with reference to the drawings.

First Embodiment

Figure 1:
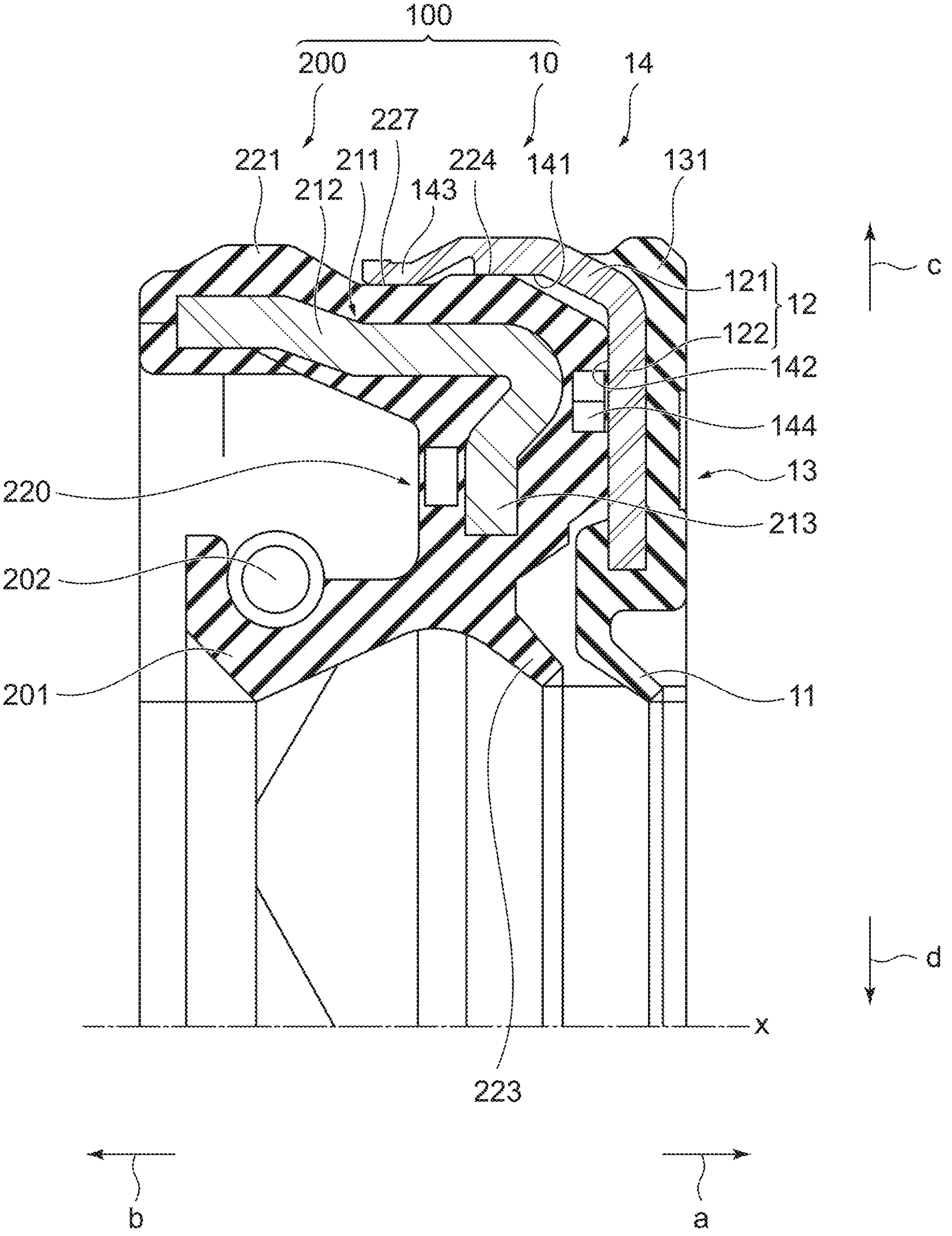
FIG. 1 A sectional view for illustrating a schematic configuration of a sealing device including a conductive sliding member according to a first embodiment of the present disclosure.
Figure 2:
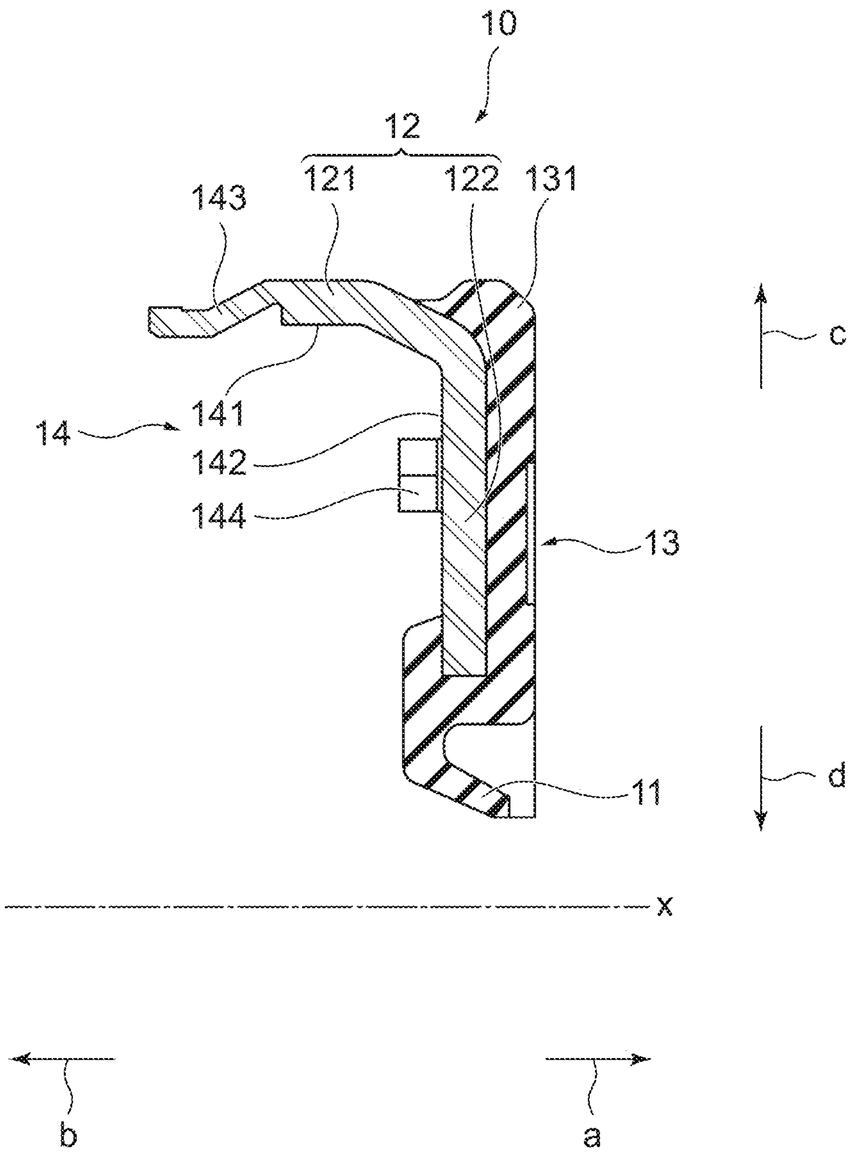
FIG. 2 A sectional view of the conductive sliding member according to the first embodiment.
Figure 3:
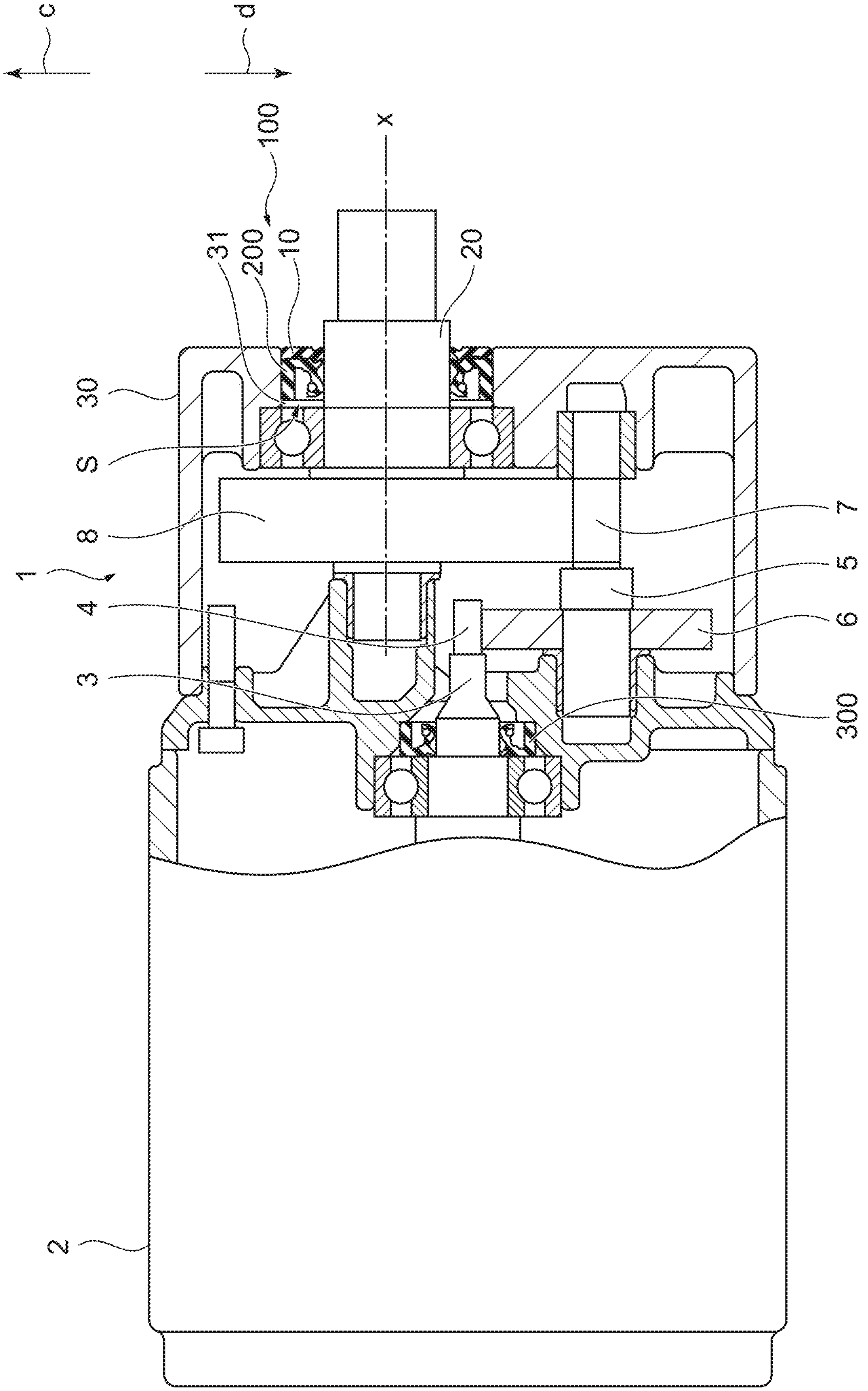
FIG. 3 A partial sectional view illustrating a reduction gear on which the sealing device according to the first embodiment is mounted.
Figure 4:
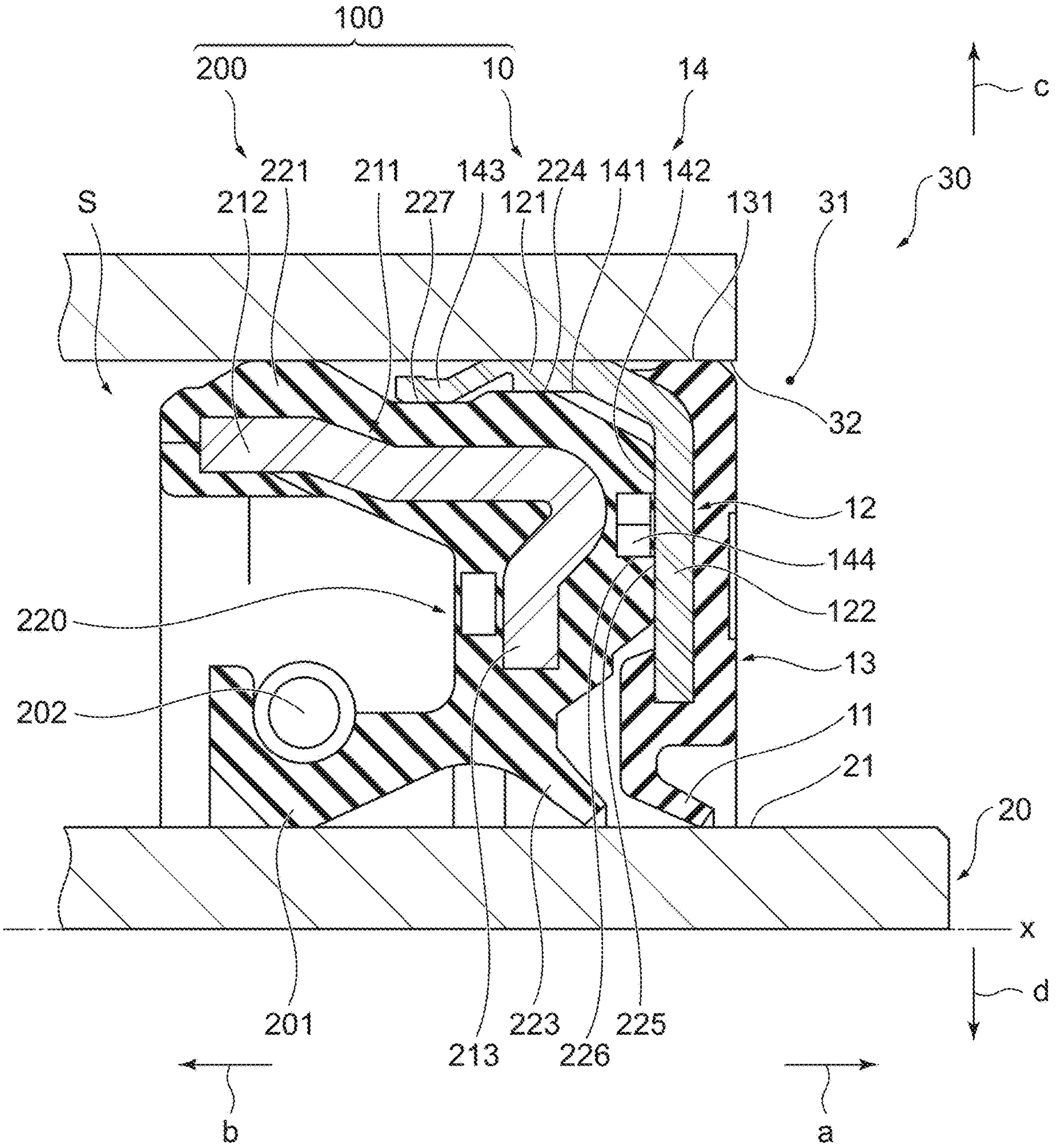
FIG. 4 A sectional view illustrating a use state of the sealing device including the conductive sliding member according to the first embodiment.

FIG. 1 is a sectional view for illustrating a schematic configuration of a sealing device 100 including a conductive sliding member 10 according to a first embodiment of the present disclosure. FIG. 2 is sectional view of the conductive sliding member 10. FIG. 3 is a partial sectional view illustrating a reduction gear 1 on which the sealing device 100 is mounted. FIG. 4 is a sectional view illustrating a use state of the sealing device 100 including the conductive sliding member 10. The conductive sliding member 10 and the sealing device 100 according to the first embodiment have substantially rotationally symmetric shapes. FIGS. 1, 2, and 4 illustrate sectional views of the conductive sliding member 10 and the sealing device 100 taken along a plane including a central axis (hereinafter, referred to as an “axis x”) of the conductive sliding member 10 and the sealing device 100.

As illustrated in FIG. 3, the sealing device 100 according to the present embodiment is mounted on a drive mechanism such as the reduction gear 1 of the vehicle equipped with the electric motor 2 such as an electric vehicle (EV) and a fuel cell vehicle (FCV). The reduction gear 1 includes, inside a housing 30, a first pinion gear 4 provided on a rotating shaft 3 of a motor 2, a first-stage gear 6 that is attached to a shaft 5 and meshes with the first pinion gear 4, a second pinion gear 7 provided on the shaft 5, a second-stage gear 8 that is attached to a shaft 20 as an output shaft and meshes with the second pinion gear 7, and the like. The sealing device 100 constitutes a sealing structure that ensures sealing of an annular space S between the relatively rotating shaft 20 and a shaft hole 31 of the housing 30 having conductivity, in the reduction gear 1. Note that the sealing device 100 may be mounted instead of a sealing device 300 attached mounted on the rotating shaft 3 side (the motor 2 side). The housing 30 is fixed to a vehicle body (not illustrated) of the vehicle, and is electrically connected to the vehicle body. In FIGS. 3 and 4, the left side (direction of arrow b in FIG. 4) is a sealing region where a sealing target fluid such as oil is sealed, and the right side (direction of arrow a in FIG. 4) is a region (atmospheric region) on a side opposite to the sealing region. The sealing device 100 is fixed to an inner peripheral surface 32 of the shaft hole 31 of the housing 30 by fitting. Then, when the shaft 20 and the housing 30 rotate relative to each other, the sealing device 100 maintains a stationary state with respect to the housing 30, and slides between the sealing device 100 and the shaft 20.

Hereinafter, for convenience of description, as illustrated in FIGS. 1, 2, 3, and 4, a direction of an arrow a (one side in an axial direction) in the axis x direction, which becomes the atmospheric region, is defined as an atmosphere side (outer side), and a direction of an arrow b (the other side in the axial direction) in the axis x direction, which becomes a sealing region at the time of use, is defined as a sealing target fluid side (inner side). In the present embodiment, a side opposite to the sealing target fluid side is the atmosphere side. In addition, in a direction perpendicular to the axis x (hereinafter, also referred to as a “radial direction”), a direction away from the axis x (direction of arrow c) is defined as an outer peripheral side, and a direction approaching the axis x (direction of arrow d) is defined as an inner peripheral side.

As illustrated in FIGS. 1, 2, and 4, the conductive sliding member 10 according to the first embodiment of the present disclosure is formed to be attachable to the annular space S between the relatively rotating shaft 20 and the housing 30. The sealing device 100 includes a sealing device main body portion 200 and the conductive sliding member 10. The sealing device main body portion 200 is formed of an elastic body having no conductivity, and includes a seal lip portion 201 which is formed to be slidable with respect to the shaft 20 and ensures sealing of the annular space S. The conductive sliding member 10 includes an annular conductive lip portion 11 which is formed of a molded body of an elastic body (conductive elastic body) having conductivity and is formed to be slidable on a surface 21 of the shaft 20, and a sealing device bonding portion 14 which is provided on the outer peripheral side of the conductive lip portion 11 and is formed to be bonded to the sealing device main body portion 200 on a side opposite to the sealing target fluid side (atmosphere side) of the sealing device 100 formed to be capable of sealing the annular space S. Hereinafter, the conductive sliding member 10, the sealing device 100, and the manufacturing method of the sealing device 100 will be specifically described.

Sealing Device

As illustrated in FIG. 1, the sealing device 100 includes the sealing device main body portion 200 and the conductive sliding member 10. The sealing device main body portion 200 includes a reinforcing ring 211 and a seal main body portion 220 that is formed of a rubber-like elastic body and is integrally provided on the reinforcing ring 211.

The sealing device main body portion 200 is, for example, a molded body obtained by molding the seal main body portion 220 formed of an elastic body having lower conductivity than an elastic body having conductivity, specifically, an elastic body having no conductivity, by insert molding using the reinforcing ring 211 as an insert component.

The reinforcing ring 211 includes a cylindrical portion 212 having a cylindrical shape or a substantially cylindrical shape centered on the axis, and a disk portion 213 having a disk shape or a substantially disk shape provided at an end portion of the cylindrical portion 212 on the atmosphere side.

The seal main body portion 220 includes an outer peripheral seal portion 221 and a dust lip portion 223 in addition to the seal lip portion 201.

The outer peripheral seal portion 221 is provided on the outer peripheral side of the cylindrical portion 212. The outer peripheral seal portion 221 is configured to be in close contact with the inner peripheral surface 32 of the shaft hole 31 of the housing 30. Since the outer peripheral seal portion 221 is provided, the sealing device 100 is fixed to the inner peripheral surface 32 of the shaft hole 31 of the housing 30 by fitting, and leakage of the sealing target fluid from the space S between the sealing device 100 and the inner peripheral surface 32 is prevented.

Both the seal lip portion 201 and the dust lip portion 223 are configured to be slidable with respect to the surface 21 of the shaft 20. The seal lip portion 201 prevents leakage of the sealing target fluid. In addition, a garter spring 202 for pressing a distal end of the seal lip portion 201 on the inner side in the radial direction against the shaft 20 is provided on the surface side of the seal lip portion 201. The dust lip portion 223 prevents foreign matter (dust and the like) from entering the sealing region side from the outside.

Conductive Sliding Member

As illustrated in FIGS. 1 and 2, the conductive sliding member 10 includes a reinforcing ring 12, and a member main body portion 13 that is integrally provided on the reinforcing ring 12 and is formed of a rubber-like elastic body having conductivity (preferably, FKM or conductive fluororubber).

The member main body portion 13 is, for example, a molded body obtained by insert molding using the reinforcing ring 12 as an insert component.

The reinforcing ring 12 includes a cylindrical portion 121 having a cylindrical shape or a substantially cylindrical shape centered on the axis x, and a disk portion 122 having a disk shape or a substantially disk shape provided at an end portion of the cylindrical portion 121 on the atmosphere side.

The cylindrical portion 121 is a surface having a cylindrical shape provided on the outer peripheral side of the conductive lip portion 11. As illustrated in FIGS. 1 and 4, the cylindrical portion 121 is a surface positioned closer to the outer peripheral side than the cylindrical portion 212 of the sealing device main body portion 200 in a state where the conductive sliding member 10 is assembled to the sealing device main body portion 200.

The disk portion 122 is a surface having a disk shape provided on the outer peripheral side of the conductive lip portion 11. As illustrated in FIGS. 1 and 4, the disk portion 122 is a surface positioned closer to the atmosphere side (side opposite to the sealing target fluid side) than the disk portion 213 of the sealing device main body portion 200 in a state where the conductive sliding member 10 is assembled to the sealing device main body portion 200.

The sealing device bonding portion 14 is formed on the atmosphere side of the sealing device 100 such that the conductive sliding member 10 can be bonded to the sealing device main body portion 200. The sealing device bonding portion 14 includes a cylindrical portion bonding portion 141 and a disk portion bonding portion 142.

The cylindrical portion bonding portion 141 is formed to be capable of being bonded to a part of the outer peripheral seal portion 221 provided on a surface on the outer peripheral side of the cylindrical portion 212 of the sealing device main body portion 200. Specifically, the cylindrical portion bonding portion 141 desirably has a shape to be bonded to a cylindrical portion bonded portion 224 formed in a part of the outer peripheral seal portion 221 on the atmosphere side.

The disk portion bonding portion 142 desirably has a shape to be bonded to a disk portion bonded portion 225 formed on the surface (surface on the atmosphere side) of the disk portion 213 of the sealing device main body portion 200, on the atmosphere side (side opposite to the sealing target fluid side) of the sealing device main body portion 200 that seals the annular space S between the shaft 20 and the housing 30.

The cylindrical portion bonding portion 141 includes a cylindrical portion engagement portion 143 that is engaged with the shape (irregular shape: cylindrical portion engaged portion 227) of the surface on the outer peripheral side of the cylindrical portion bonded portion 224. Note that the cylindrical portion engaged portion 227 and the cylindrical portion engagement portion 143 are not limited to the shapes illustrated in FIGS. 1 to 4 as long as the cylindrical portion engaged portion 227 and the cylindrical portion engagement portion 143 can be engaged with each other in the present embodiment.

The disk portion bonding portion 142 includes a disk portion engagement portion 144 that is engaged with a disk portion engaged portion 226 that is provided in the disk portion bonded portion 225 and has a concave shape. Note that the disk portion engaged portion 226 and the disk portion engagement portion 144 are configured in the present embodiment such that the disk portion engaged portion 226 has a concave shape and the disk portion engagement portion 144 has a convex shape, but the disk portion engaged portion 226 may have a convex shape and the disk portion engagement portion 144 may have a concave shape.

The member main body portion 13 includes the conductive lip portion 11 and a housing contact portion 131. The conductive lip portion 11 is configured to be slidable with respect to the surface 21 of the shaft 20. The conductive lip portion 11 may be provided with irregularities on a contact surface with the surface 21 of the shaft 20. The housing contact portion 131 is provided closer to the outer peripheral side than the conductive lip portion 11 in the member main body portion 13, specifically, at a position where the housing contact portion can be in contact with the inner peripheral surface 32 of the shaft hole 31 of the housing 30 at the time of use. In the member main body portion 13 formed of a conductive elastic body, the conductive lip portion 11 is in contact with the surface 21 of the shaft 20, and the housing contact portion 131 is in contact with the inner peripheral surface 32 of the housing 30, thereby forming a conductive path from the shaft 20 to the housing 30 via the conductive sliding member 10. As described above, the housing 30 is fixed to a vehicle body (not illustrated) of the vehicle, and is electrically connected to the vehicle body. Therefore, in the vehicle including the reduction gear 1 to which the sealing device 100 is attached, the conductive path for grounding is formed via the shaft 20 and the conductive sliding member 10. That is, according to the present embodiment, the induced current from the motor or the like that causes the high-frequency noise and the electrical erosion of the bearing flows to the housing 30 via the conductive path. Therefore, according to the embodiment, it is possible to reduce the induced current from the motor or the like that causes the high-frequency noise and the electrical erosion of the bearing.

Next, the manufacturing method of the sealing device 100 including the conductive sliding member 10 described above will be described.

Figure 5:
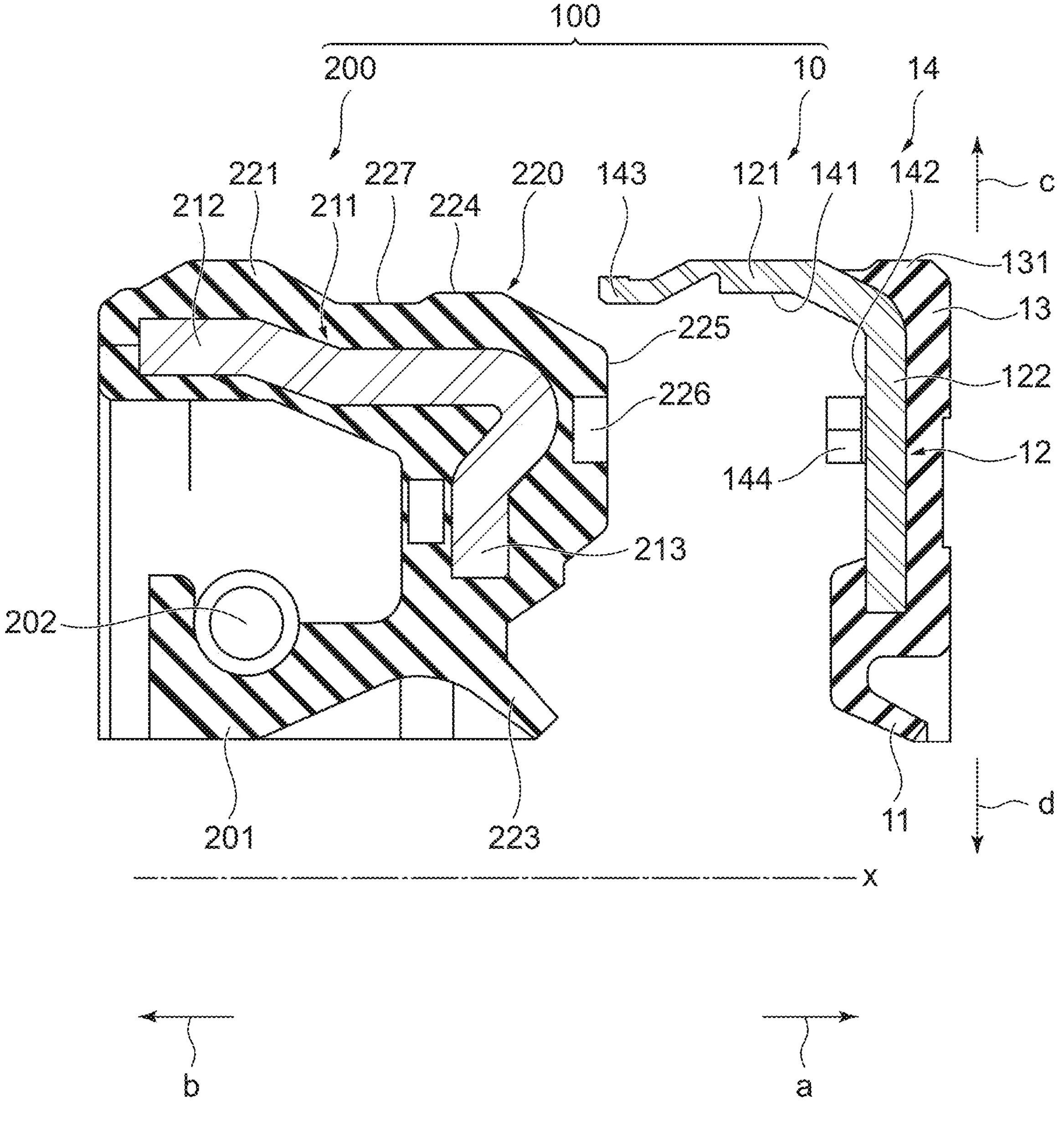
FIG. 5 A sectional view illustrating a state before the conductive sliding member and a sealing device main body portion are assembled in a manufacturing method of the sealing device according to the first embodiment.
Figure 6:
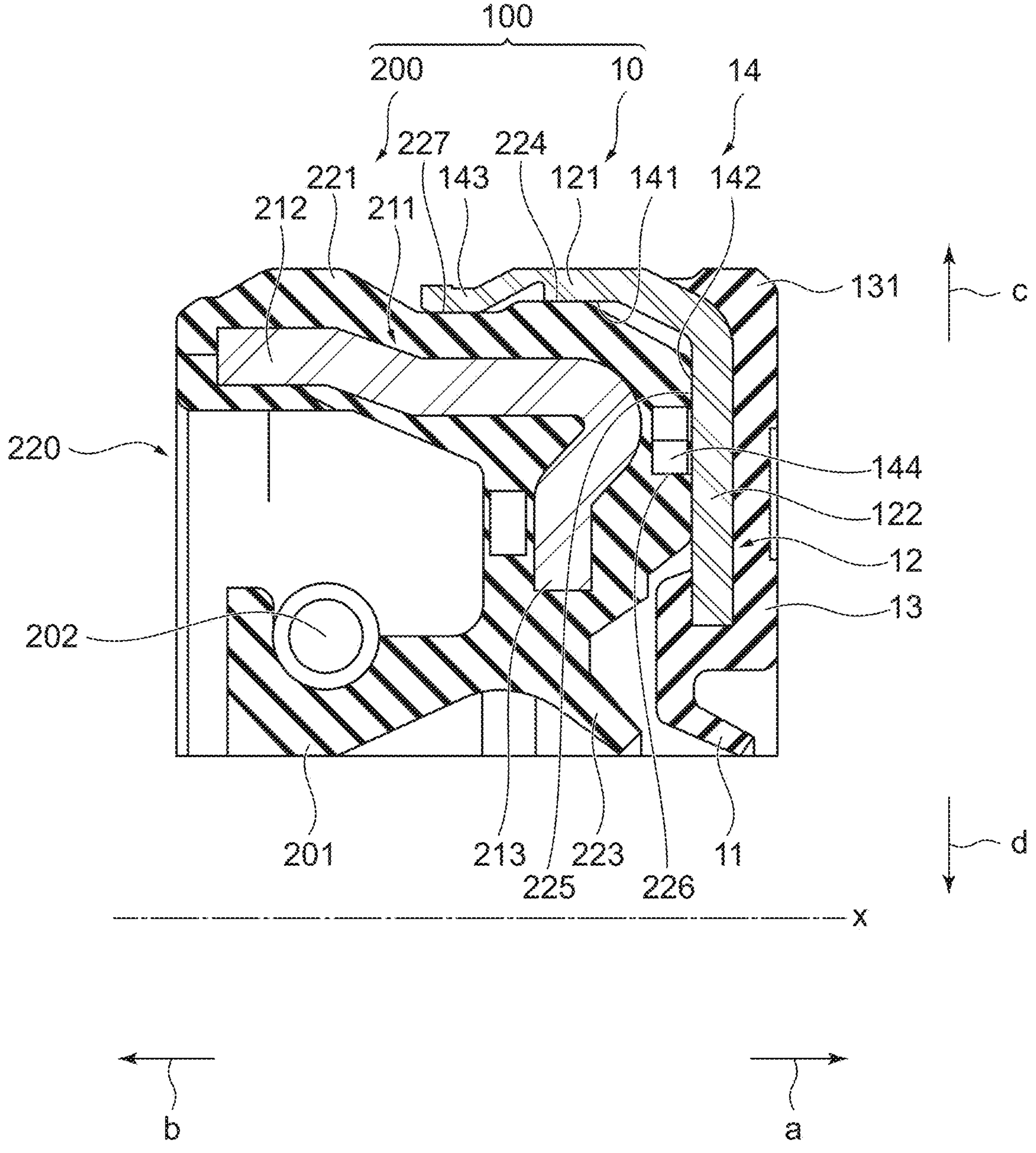
FIG. 6 A sectional view illustrating a state after the conductive sliding member and the sealing device main body portion are assembled in the manufacturing method of the sealing device according to the first embodiment.
Figure 7:
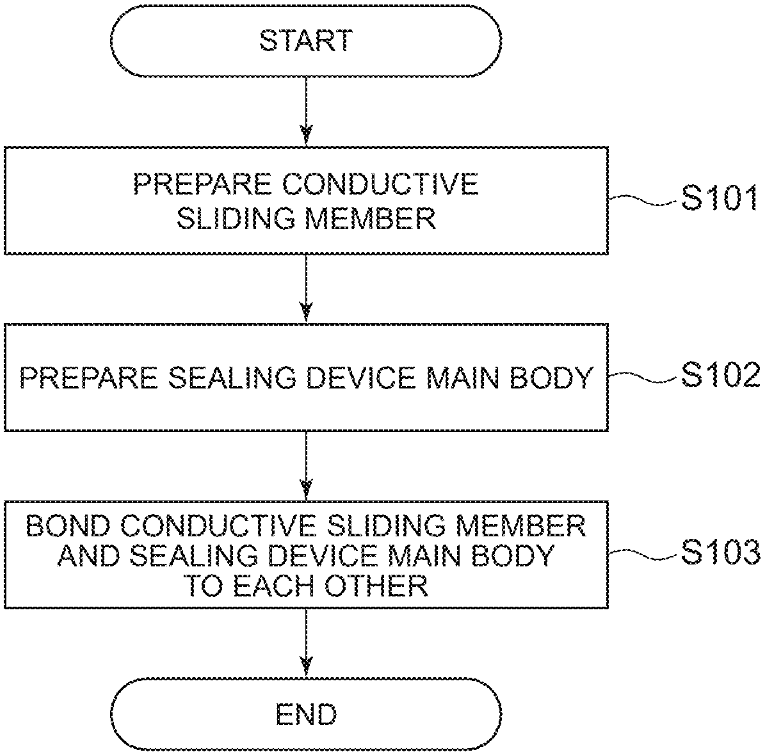
FIG. 7 A flowchart illustrating a procedure of the manufacturing method of the sealing device according to the first embodiment.

FIG. 5 is a sectional view illustrating a state before the conductive sliding member 10 and the sealing device main body portion 200 are assembled in the manufacturing method of the sealing device 100 according to the first embodiment. FIG. 6 is a sectional view illustrating a state after the conductive sliding member 10 and the sealing device main body portion 200 are assembled in the manufacturing method of the sealing device 100 according to the first embodiment. FIG. 7 is a flowchart illustrating a procedure of the manufacturing method of the sealing device 100 according to the first embodiment.

As illustrated in FIGS. 5 and 7, in order to manufacture the sealing device 100, the conductive sliding member 10 in which the member main body portion 13 is formed of an elastic body having conductivity by insert molding using the reinforcing ring 12 as an insert component is prepared (step S101). In order to manufacture the sealing device 100, the sealing device main body portion 200 in which the seal main body portion 220 is formed of an elastic body having no conductivity by insert molding using the reinforcing ring 211 as an insert component is prepared (step S102). Then, as illustrated in FIG. 6, the conductive sliding member 10 and the sealing device main body portion 200 that are prepared in advance are bonded to each other (step S103). Specifically, in step S103, the disk portion bonding portion 142 of the conductive sliding member 10 is bonded to the disk portion 213 of the sealing device main body portion 200, and the cylindrical portion bonding portion 141 of the conductive sliding member 10 is bonded to the cylindrical portion 212 of the sealing device main body portion 200. When the conductive sliding member 10 and the sealing device main body portion 200 are bonded to each other, the disk portion engaged portion 226 provided in the disk portion bonded portion 225 of the sealing device main body portion 200 and the disk portion engagement portion 144 provided in the disk portion bonding portion 142 of the conductive sliding member 10 are engaged with each other. In addition, the cylindrical portion engaged portion 227 provided in the cylindrical portion bonded portion 224 of the sealing device main body portion 200 and the cylindrical portion engagement portion 143 provided in the cylindrical portion bonding portion 141 of the conductive sliding member 10 are engaged with each other.

After the conductive sliding member 10 and the sealing device main body portion 200 are assembled, the sealing device 100 is installed in the annular space S between the shaft 20 and the housing 30 as illustrated in FIG. 4.

With the sealing device 100 configured as described above, when the sealing device 100 is installed in the annular space S between the shaft 20 and the housing 30, the conductive sliding member 10 and the sealing device main body portion 200 can be installed in an assembled state. Specifically, in the sealing device 100, the member main body portion 13 including the conductive lip portion 11 of the conductive sliding member 10 is a molded body formed of an elastic body having conductivity. Therefore, as compared with a conductive sliding member in the related art, which is formed of a conductive brush or fiber, deformation of the member main body portion 13 is suppressed, so that attachment to the sealing device main body portion 200 is easy.

The conductive sliding member 10 has the cylindrical portion engagement portion 143 provided in the cylindrical portion bonding portion 141, and the disk portion engagement portion 144 provided in the disk portion bonding portion 142, so that the attachment and the positioning to the sealing device main body portion 200 can be easily performed. That is, with the sealing device 100 including the conductive sliding member 10, skill is not required for manufacturing work and attachment work to the annular space S. In addition, with the sealing device 100 including the conductive sliding member 10, the conductive sliding member 10 can be assembled to the sealing device main body portion 200 and installed in the annular space S, and therefore the time required for installation work can be shortened.

The improvement of the easiness of the assembling work to the sealing device 100 and the attachment work to the annular space S by the conductive sliding member 10 described above is particularly remarkable in a case where an attachment space (the annular space S and a space around the annular space S) of the sealing device 100 is small.

Since the conductive sliding member 10 can be easily positioned with respect to the sealing device main body portion 200, by matching the dimensions of the conductive lip portion 11 and the seal lip portion 201 of the sealing device main body portion 200 with the dimension of the shaft 20, the conductive sliding member 10 can be easily assembled to another sealing device main body portion having different specifications and used as a sealing device having conductivity. In other words, in the sealing device 100, since the conductive sliding member 10 and the sealing device main body portion 200 can be separately produced, by changing only the specifications of the conductive sliding member 10 without changing the specifications of the sealing device main body portion 200 that ensures sealing of the sealing target fluid, it is possible to impart conductivity suitable for the requirements and specifications to address noise and the like from the motor 2 without impairing the sealing performance for the sealing target fluid.

In addition, with the conductive sliding member 10, the conductive sliding member 10 is assembled to the existing sealing device main body portion 200, and thereby it is possible to impart conductivity suitable for the requirements and specifications to address noise and the like from the motor 2 without impairing the sealing performance for the sealing target fluid. In this case, the conductive sliding member 10 has the cylindrical portion engagement portion 143 provided in the cylindrical portion bonding portion 141, and the disk portion engagement portion 144 provided in the disk portion bonding portion 142, so that the attachment and the positioning to the sealing device main body portion 200 can be easily performed.

Accordingly, with the sealing device 100 including the conductive sliding member 10 and the manufacturing method of the sealing device, it is possible to easily impart conductivity.

Second Embodiment

Next, a sealing device 100B including a conductive sliding member 10B according to a second embodiment of the present disclosure will be described. Hereinafter, configurations having the same or similar functions as those of the conductive sliding member 10, the sealing device main body portion 200, and the sealing device 100 according to the first embodiment described above are denoted by the same reference numerals, description thereof is omitted, and only different configurations will be described.

Figure 8:
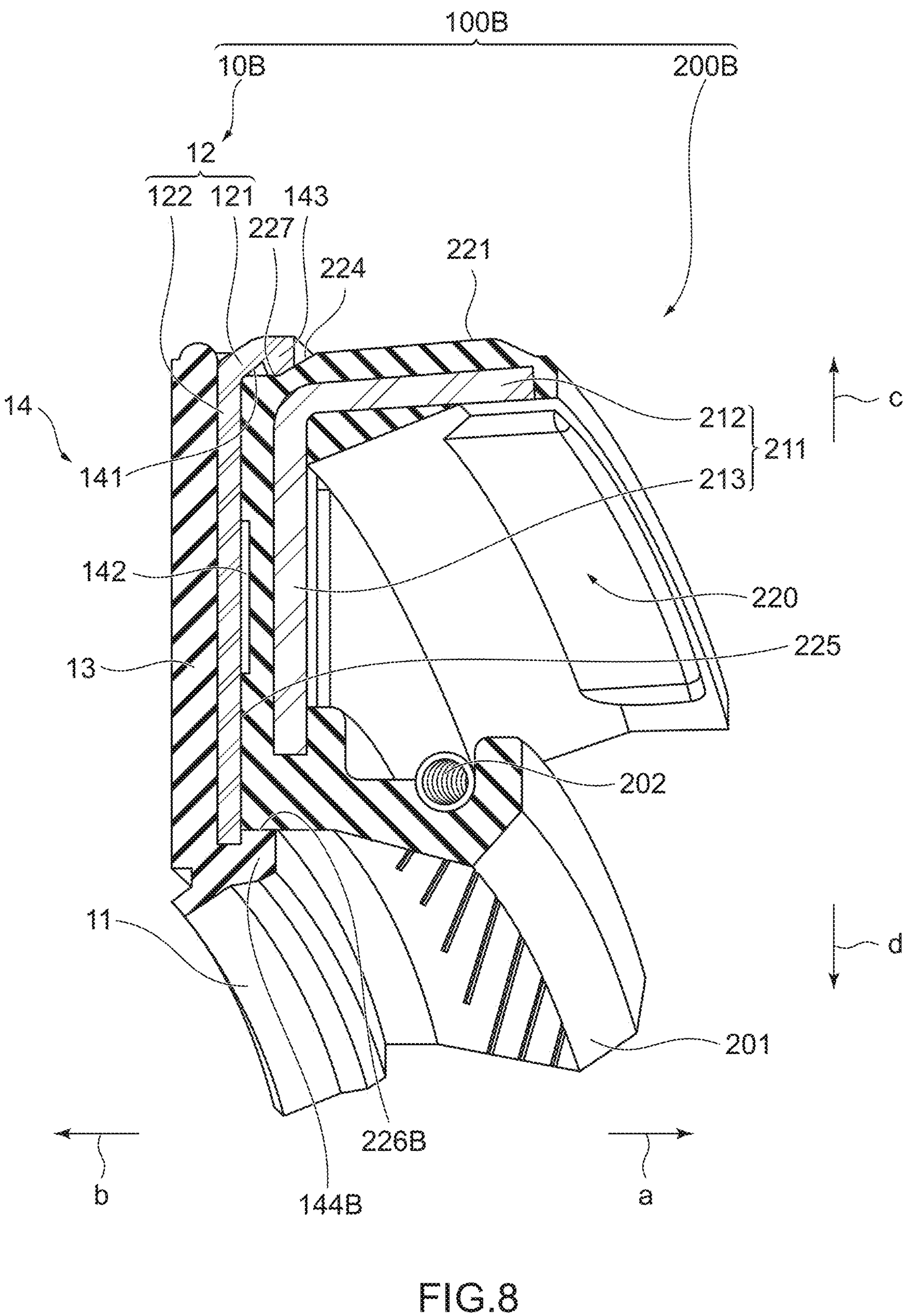
FIG. 8 A sectional perspective view of a conductive sliding member and a sealing device according to a second embodiment of the present disclosure.

FIG. 8 is a sectional perspective view of the sealing device 100B including the conductive sliding member 10B according to the second embodiment of the present disclosure.

The sealing device 100B including the conductive sliding member 10B illustrated in FIG. 8 is different from the sealing device 100 including the conductive sliding member 10 described above mainly in a configuration of a disk portion engagement portion 144B provided in the disk portion bonding portion 142 of the conductive sliding member 10B and a configuration of a disk portion engaged portion 226B provided in the disk portion bonded portion 225 of a sealing device main body portion 200B.

Specifically, the disk portion engagement portion 144B is provided near the inner periphery of the disk portion bonding portion 142 of the member main body portion 13 of the conductive sliding member 10B. The disk portion engagement portion 144B is formed in a convex shape toward the sealing device main body portion 200B side (outer peripheral side) in the assembled state. The disk portion engaged portion 226B is formed in a concave shape toward the conductive sliding member 10B side (inner peripheral side) in the assembled state to be capable of receiving the disk portion engagement portion 144B. The disk portion engagement portion 144B and the disk portion engaged portion 226B are provided on the inner peripheral side of the cylindrical portion engagement portion 143 and the cylindrical portion engaged portion 227.

With the sealing device 100B including the conductive sliding member 10B according to the second embodiment, similarly to the sealing device 100 including the conductive sliding member 10 described above, it is possible to easily impart conductivity.

Third Embodiment

Next, a sealing device 100C including a conductive sliding member 10C according to a third embodiment of the present disclosure will be described. Hereinafter, configurations having the same or similar functions as those of the conductive sliding members 10 and 10B, the sealing device main body portions 200 and 200B, and the sealing devices 100 and 100B according to the first and second embodiments described above are denoted by the same reference numerals, description thereof is omitted, and only different configurations will be described.

Figure 9:
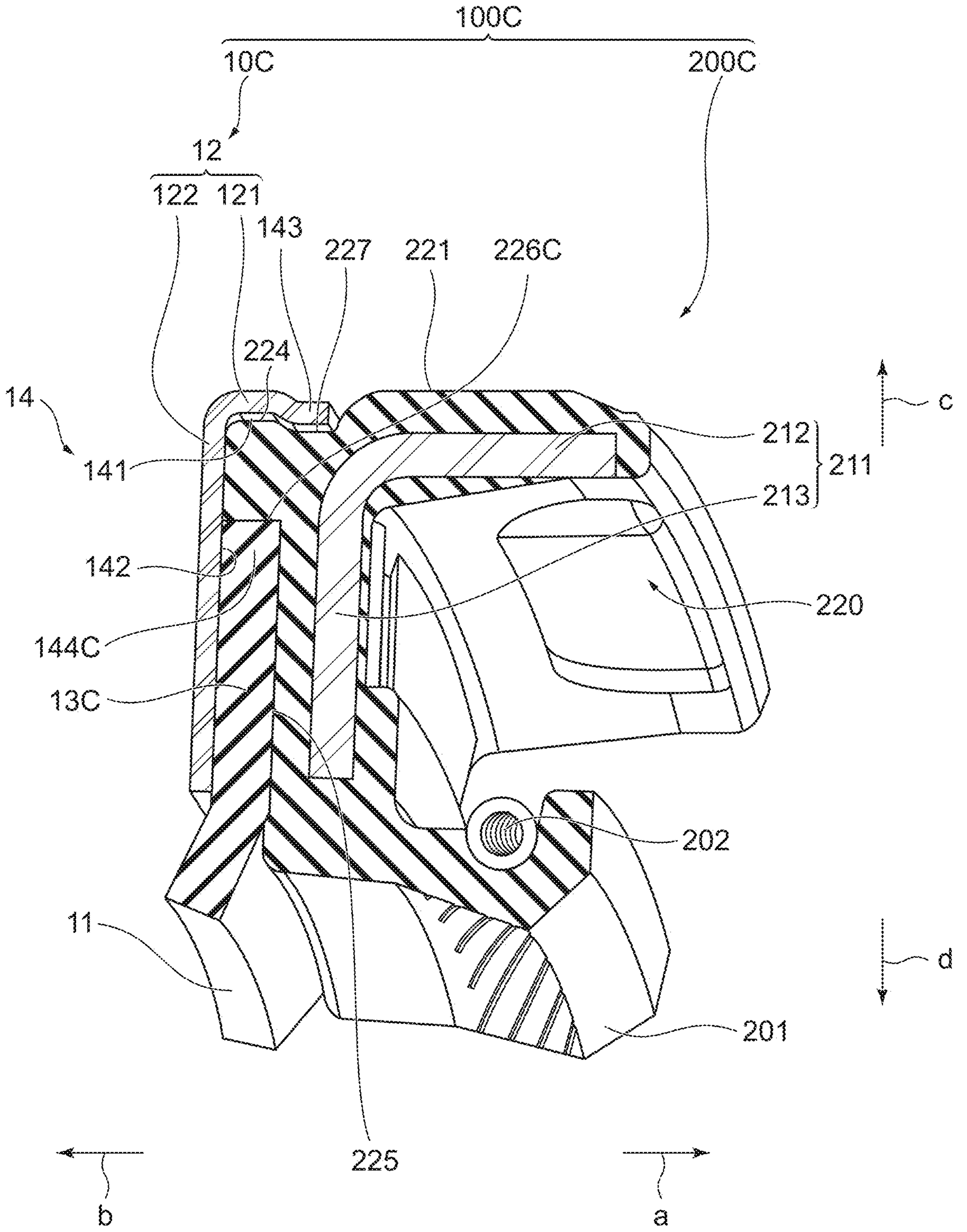
FIG. 9 A sectional perspective view of a conductive sliding member and a sealing device according to a third embodiment of the present disclosure.

FIG. 9 is a sectional perspective view of the sealing device 100C including the conductive sliding member 10C according to the third embodiment of the present disclosure.

In the sealing device 100C including the conductive sliding member 10C illustrated in FIG. 9, a material constituting a member main body portion 13C of the conductive sliding member 10C is an elastic body having conductivity (for example, an elastic body having rubber-like conductivity or a conductive resin such as conductive PTFE). The sealing device 100C including the conductive sliding member 10C is different from the sealing device 100 including the conductive sliding member 10 described above mainly in a configuration of a disk portion engagement portion 144C provided in the disk portion bonding portion 142 of the conductive sliding member 10C and a configuration of a disk portion engaged portion 226C provided in the disk portion bonded portion 225 of a sealing device main body portion 200C.

Specifically, the disk portion engagement portion 144C is attached to the disk portion 122 of the reinforcing ring 12 on the sealing target fluid side. Therefore, the disk portion engagement portion 144C has a convex shape protruding from the disk portion 122 toward the sealing target fluid side. The disk portion engaged portion 226C is formed in a concave shape toward the conductive sliding member 10C side (inner peripheral side) in the assembled state to be capable of receiving the disk portion engagement portion 144C.

With the sealing device 100C including the conductive sliding member 10C according to the third embodiment, similarly to the sealing device 100 including the conductive sliding member 10 described above, it is possible to easily impart conductivity. In addition, with the sealing device 100C, since the distance between the metal reinforcing ring 12 and the shaft is decreased in the use state, the conductive path from the conductive lip portion 11 to the housing is shortened, and conductivity can be further improved.

Fourth Embodiment

Next, a sealing device 100D including the conductive sliding member 10 according to a fourth embodiment of the present disclosure will be described. Hereinafter, configurations having the same or similar functions as those of the conductive sliding member 10, the sealing device main body portion 200, and the sealing device 100 according to the first embodiment described above are denoted by the same reference numerals, description thereof is omitted, and only different configurations will be described.

Figure 10:
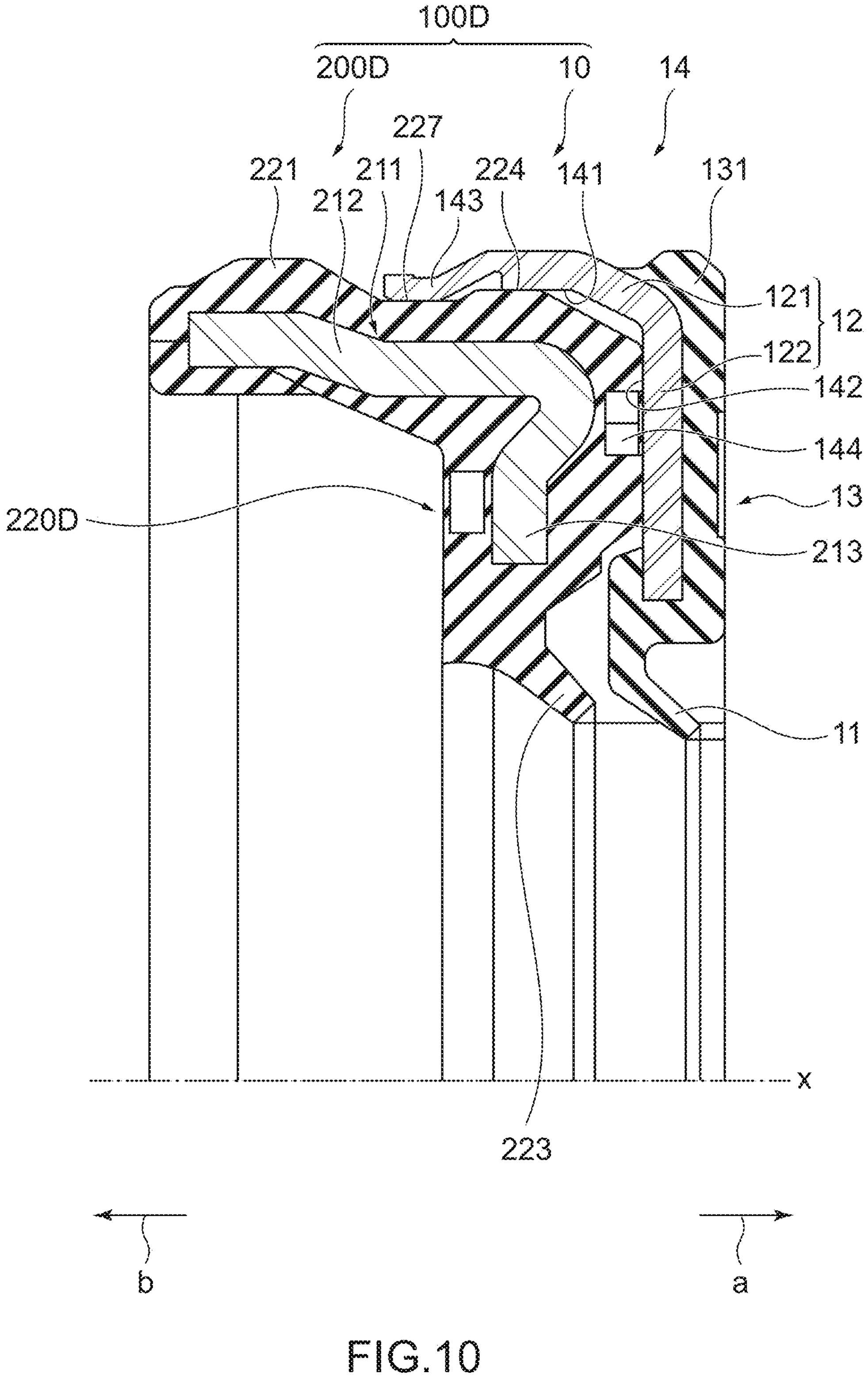
FIG. 10 A sectional view for illustrating a schematic configuration of a sealing device including a conductive sliding member according to a fourth embodiment of the present disclosure.

FIG. 10 is a sectional view of the sealing device 100D including the conductive sliding member 10 according to the fourth embodiment of the present disclosure.

In the sealing device 100D illustrated in FIG. 10, a sealing device main body portion 200D is a dust seal that suppresses the entry of dust or dirt from the atmosphere side to the sealing target fluid side using the dust lip portion 223. That is, in the sealing device 100D, a seal main body portion 220D of the sealing device main body portion 200D is not provided with the seal lip portion 201 201 and the garter spring 202 provided in the sealing device 100 including the conductive sliding member 10 described above. The conductive sliding member 10 is not limited to the example of being used in combination with the oil seal that suppresses the leakage of a sealing fluid such as the oil from the sealing target fluid side to the atmosphere side by the seal lip portion 201 such as the sealing device main body portion 200 in the sealing device 100 and the like described above, and may be used in combination with the dust seal such as the sealing device main body portion 200D.

With the sealing device 100D including the conductive sliding member 10 according to the fourth embodiment, similarly to the sealing device 100 described above, it is possible to easily impart conductivity to the sealing device main body portion 200D.

Fifth Embodiment

Next, a sealing device 100E including the conductive sliding member 10C according to a fifth embodiment of the present disclosure will be described. Hereinafter, configurations having the same or similar functions as those of the sealing device main body portion 200C and the sealing device 100C according to the third embodiment described above are denoted by the same reference numerals, description thereof is omitted, and only different configurations will be described.

Figure 11:
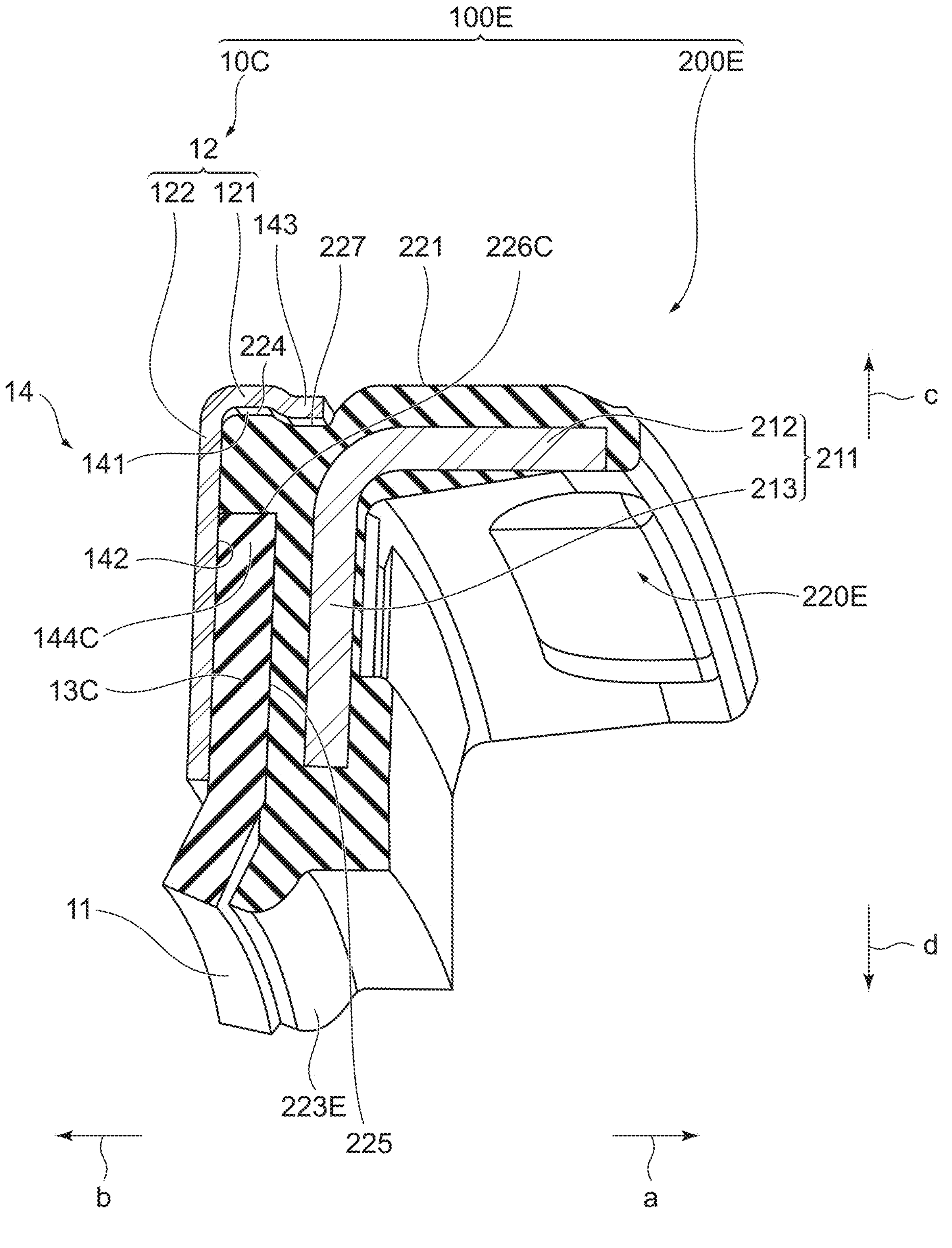
FIG. 11 A sectional perspective view of a conductive sliding member and a sealing device according to a fifth embodiment of the present disclosure.

FIG. 11 is a sectional perspective view of the sealing device 100E including the conductive sliding member 10C according to the fifth embodiment of the present disclosure.

In the sealing device 100E including the conductive sliding member 10C illustrated in FIG. 11, a sealing device main body portion 200E is a dust seal that suppresses the entry of dust or dirt from the atmosphere side to the sealing target fluid side using a dust lip portion 223E. That is, the sealing device 100E is different from the sealing device 100C described above in that a seal main body portion 220E of the sealing device main body portion 200E is not provided with the seal lip portion 201 and the garter spring 202 and is instead provided with the dust lip portion 223E. The conductive sliding member 10C is not limited to the example of being used in combination with the oil seal that suppresses the leakage of the sealing fluid such as the oil from the sealing target fluid side to the atmosphere side by the seal lip portion 201 such as the sealing device main body portion 200C in the sealing device 100C and the like described above, and may be used in combination with the dust seal such as the sealing device main body portion 200E.

With the sealing device 100E according to the fifth embodiment, similarly to the sealing device 100C including the conductive sliding member 10C described above, it is possible to easily impart conductivity to the sealing device main body portion 200E.

The embodiments of the present disclosure have been described above, but the present disclosure is not limited to the embodiments described above, and includes all aspects included in the concept and claims of the present disclosure. In addition, each configuration may be appropriately and selectively combined to achieve at least a part of the above-described problems and effects. For example, the shape, material, arrangement, size, and the like of each constituent element in the embodiments described above can be appropriately changed according to a specific usage aspect of the present disclosure.

For example, in the embodiments described above, the example in which the sealing device bonding portion 14 includes the cylindrical portion bonding portion 141 and the disk portion bonding portion 142 has been described. The sealing device bonding portion 14 is not limited to this example as long as the conductive sliding member 10 can be bonded to the sealing device main body portion 200. The sealing device bonding portion may be, for example, one that can be bonded by a protrusion and a concave portion provided in the sealing device main body portion, or one that can be fitted to the sealing device main body portion.

For example, in the embodiments described above, the example in which the cylindrical portion engagement portion 143 is provided in the cylindrical portion bonding portion 141 has been described. In the conductive sliding member, the cylindrical portion bonding portion is not limited to this example, and may be capable of being simply in contact with the sealing device main body portion without having a claw-shaped or uneven-shaped part engaged with the sealing device main body portion.

For example, in the embodiments described above, the example in which the disk portion engagement portion 144 is provided in the disk portion bonding portion 142 has been described. In the conductive sliding member, the disk portion engagement portion is not limited to this example, and may be capable of being simply in contact with the sealing device main body portion without having a claw-shaped or uneven-shaped part engaged with the sealing device main body portion.

For example, in the embodiments described above, the example in which the housing contact portion 131 is formed of an elastic body having conductivity and is in contact with the housing 30 to form the conductive path has been described. In the conductive sliding member, the conductive path from the shaft 20 to the housing 30 is not limited to this example, and for example, the conductive path may be formed by the reinforcing ring 12 (made of metal), which has conductivity and is electrically connected to the member main body portion 13, being in contact with the housing 30. In addition, in a case where the metal reinforcing ring 211 of the sealing device main body portion 200 is exposed from the outer peripheral seal portion 221, the reinforcing ring 12 of the conductive sliding member is electrically in contact with the reinforcing ring 211 of the sealing device main body portion 200, and thereby the conductive sliding member 10 may form a conductive path.

The invention claimed is:

1. A conductive sliding member attached to an annular space between a relatively rotating shaft having a central axis and a housing having conductivity, the conductive sliding member comprising:

a member main body portion formed of a molded body of an elastic body having conductivity;

an annular conductive lip portion that is formed on the member main body portion, and is slidable on a surface of the shaft; and a sealing device bonding portion that is provided on an outer peripheral side of the conductive lip portion in the reinforcing ring and is capable of being bonded to a sealing device main body portion on a side opposite to a sealing target fluid side of the sealing device main body portion that seals the space, wherein the sealing device bonding portion includes:

a disk portion bonding portion that is a disk-shaped surface provided on the outer peripheral side of the conductive lip portion and is capable of being bonded to a disk portion of the sealing device main body portion on the side opposite to the sealing target fluid side of the sealing device main body portion that seals the space, a cylindrical portion bonding portion that is provided on an outer peripheral side of the disk portion bonding portion and is capable of being bonded to a surface on an outer peripheral side of a cylindrical portion of the sealing device main body portion, and wherein the disk portion bonding portion includes a disk portion engagement portion that protrudes in a direction of the central axis of the shaft and is configured to engage a disk portion engaged portion provided on a surface of the disk portion of the sealing device main body portion on a side opposite to the sealing target fluid side.

2. The conductive sliding member according to claim 1, wherein the cylindrical portion bonding portion includes a cylindrical portion engagement portion that is capable of being engaged with a cylindrical portion engaged portion provided on a surface of the cylindrical portion of the sealing device main body portion on the outer peripheral side.

3. A sealing device that ensures sealing of an annular space between a relatively rotating shaft having a central axis and a housing having conductivity, the sealing device comprising:

a sealing device main body portion that is slidable with respect to the shaft and ensures sealing of the space; and a conductive sliding member that is provided on a side opposite to a sealing target fluid side of the sealing device main body portion and is formed of a molded body of a conductive elastic body, wherein the sealing device main body portion includes a seal lip portion that is formed of an elastic body having lower conductivity than the conductive elastic body, and the conductive sliding member includes a member main body portion that is integrally provided on a metal reinforcing ring, using the reinforcing ring as an insert component, an annular conductive lip portion that is formed on the member main body portion and is slidable on a surface of the shaft, and a sealing device bonding portion that is provided on an outer peripheral side of the conductive lip portion in the reinforcing ring and is capable of being bonded to the sealing device main body portion on the side opposite to the sealing target fluid side of the sealing device main body portion that is capable of sealing the space, wherein in the conductive sliding member, the sealing device bonding portion includes:

a disk portion bonding portion that is a disk-shaped surface provided on the outer peripheral side of the conductive lip portion and is capable of being bonded to a disk portion of the sealing device main body portion on the side opposite to the sealing target fluid side of the sealing device main body portion, and a cylindrical portion bonding portion that is provided on an outer peripheral side of the disk portion bonding portion and is capable of being bonded to a surface on an outer peripheral side of a cylindrical portion of the sealing device main body portion, wherein in the conductive sliding member, the disk portion bonding portion includes a disk portion engagement portion that protrudes in a direction of the central axis of the shaft and is configured to engage a disk portion engaged portion provided on a surface of the disk portion of the sealing device main body portion on a side opposite to the sealing target fluid side.

4. The sealing device according to claim 3, wherein in the conductive sliding member, the cylindrical portion bonding portion includes a cylindrical portion engagement portion that is capable of being engaged with a cylindrical portion engaged portion provided on a surface of the cylindrical portion of the sealing device main body portion on the outer peripheral side.

5. A manufacturing method of a sealing device that ensures sealing of an annular space between a relatively rotating shaft having a central axis and a housing having conductivity, the manufacturing method comprising:

preparing a sealing device main body portion that is formed to be slidable with respect to the shaft and ensures sealing of the space;

preparing a conductive sliding member that is integrally provided on a metal reinforcing ring using the reinforcing ring as an insert component and is formed of a molded body of a conductive elastic body, in the conductive sliding member:

providing a sealing device bonding portion, on an outer peripheral side of an annular conductive lip portion, in the reinforcing ring, the sealing device bonding portion being capable of being bonded to the sealing device main body portion on a side opposite to a sealing target fluid side of the sealing device main body portion that seals the space, the sealing device bonding portion including:

a disk portion bonding portion that is a disk-shaped surface provided on the outer peripheral side of the conductive lip portion and is capable of being bonded to a disk portion of the sealing device main body portion on the side opposite to the sealing target fluid side of the sealing device main body portion that seals the space; and a cylindrical portion bonding portion that is on an outer peripheral side of the disk portion bonding portion and is capable of being bonded to a surface on an outer peripheral side of a cylindrical portion of the sealing device main body portion, and the disk portion bonding portion being provided with a disk portion engagement portion that protrudes in a direction of the central axis of the shaft and is configured to engage a disk portion engaged portion provided on a surface of the disk portion of the sealing device main body portion on a side opposite to the sealing target fluid side; and bonding the sealing device main body portion and the conductive sliding member to each other on a side opposite to a sealing target fluid side of the sealing device main body portion.

6. The manufacturing method of a sealing device according to claim 5, wherein the conductive sliding member includes a member main body portion formed of the molded body of the conductive elastic body, the conductive lip portion formed on the member main body portion, and is slidable on a surface of the shaft, and in the bonding the sealing device main body portion and the conductive sliding member to each other, the sealing device bonding portion of the conductive sliding member is bonded to the sealing device main body portion.

7. The manufacturing method of a sealing device according to claim 6, wherein the sealing device main body portion includes a reinforcing ring that includes a cylindrical portion formed in a cylindrical shape centered on the central axis, and a disk portion that is provided at an end portion of the cylindrical portion on a side opposite to the sealing target fluid side and is formed in a disk shape, and a seal main body portion that is an elastic body having lower conductivity than the conductive elastic body to be molded in the reinforcing ring and includes a seal lip portion, and in the bonding the sealing device main body portion and the conductive sliding member to each other, the disk portion bonding portion of the conductive sliding member is bonded to the disk portion of the sealing device main body portion, and the cylindrical portion bonding portion of the conductive sliding member is bonded to the cylindrical portion of the sealing device main body portion.

8. The manufacturing method of a sealing device according to claim 7, wherein the conductive sliding member includes a cylindrical portion engagement portion that is formed in the cylindrical portion bonding portion and is capable of being engaged with the cylindrical portion of the sealing device main body portion, and a disk portion engagement portion that is formed in the disk portion bonding portion and is capable of being engaged with the disk portion the sealing device main body portion.

* * * * *